United States Patent
Mott

[11] 3,872,576
[45] Mar. 25, 1975

[54] INLINE FILTER CONSTRUCTION

[76] Inventor: Lambert H. Mott, P.O. Drawer L, Farmington, Conn. 06032

[22] Filed: Apr. 1, 1974

[21] Appl. No.: 456,608

[52] U.S. Cl................. 29/471.7, 29/493, 210/445, 210/446
[51] Int. Cl............................................. B23k 5/08
[58] Field of Search ........... 29/471.7, 493, 163.5 F, 29/487, 484, 463, 435, 451, 456; 210/31 C, 198 C, 445, 446; 55/197

[56] References Cited
UNITED STATES PATENTS

| | | | |
|---|---|---|---|
| 3,156,976 | 11/1964 | Whiting | 29/471.7 |
| 3,406,828 | 10/1968 | Boston | 210/446 |
| 3,658,183 | 4/1972 | Best et al. | 210/446 |
| 3,792,519 | 2/1974 | Haver | 29/163.5 F |

*Primary Examiner*—Al Lawrence Smith
*Assistant Examiner*—Harold P. Smith, Jr.
*Attorney, Agent, or Firm*—Peter L. Tailer

[57] ABSTRACT

Two sides of a filter body are clamped about a porous filter disk which rests within recesses in the filter body sides with support and flow dispersal screens on each side of the filter disk in smaller, shallower recesses, the sides are peripherally welded to each other, the weld is allowed to cool and shrink clamping the filter disk between the sides to seal it within the filter body, the filter body is unclamped, and inlet and outlet tubes are fixed in central tube receiving bores in the filter body sides.

5 Claims, 7 Drawing Figures

PATENTED MAR 25 1975                                    3,872,576

INLINE FILTER CONSTRUCTION

BACKGROUND OF THE INVENTION

There is a need for a relatively inexpensive filter with a low void volume capable of withstanding pressures of up to 5,000 p.s.i. for use with chromatography apparatus and the like. The filter construction method of this invention provides such a filter.

SUMMARY OF THE INVENTION

A disposable inline filter is made by providing two filter body sides each containing a filter recess to receive a porous filter disk, a shallow smaller screen recess to receive a filter support and flow disperal screen, and a central tube receiving bore; placing screens within the smaller screen recesses; placing a filter disk within the filter recesses; clamping the sides about the filter disk with a small clearance between the sides; peripherally welding the sides together; allowing the peripheral weld to cool and contract clamping the filter disk; unclamping the filter body; and fixing tube lengths in the tube receiving bores of the sides.

In high pressure filters for instrumentation, this method of construction makes possible a less costly and superior filter. The shrinking of the circumferential weld clamps the porous filter disk without the need for special seals or sealing techniques to prevent unfiltered flow past the filter disk. The screens serve to disperse flow and support the filter disk as it receives high pressure on its upstream side that would otherwise break it. The filter can be connected using 1/16 inch or ⅛ inch compression tubing fittings. To reuse the filter, the tube ends are snipped off and it is used again. This filter construction provides a very low void volume which is desirable in chromatography and other uses.

BRIEF DESCRIPTION OF THE DRAWING

FIG. 3 is a side view showing filter body sides clamped together and being peripherally welded;

FIG. 4 is a side view of welded filter body sides having their peripheral weld ground;

FIGS. 5 and 6 are plan views of filter support and flow dispersal screens; and

FIG. 7 is an axial section through a side of a filter body.

DESCRIPTION OF THE PREFERRED EMBODIMENT

Figure 1:
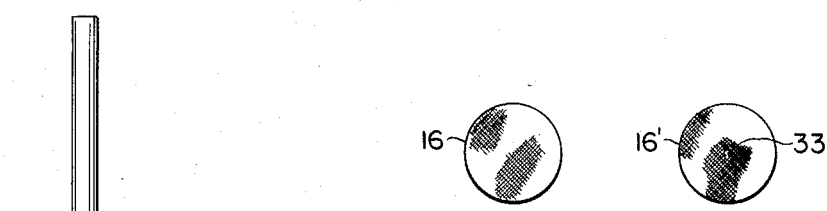
FIG. 1 is a longitudinal section through a filter assembled according to the method of this invention.
Figure 1:
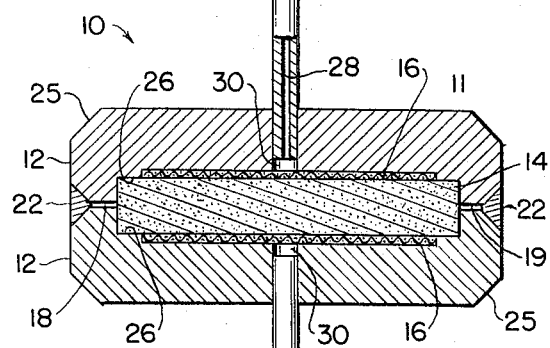

As shown in FIGS. 1–7, an inline filter 10 is fabricated by preparing a filter body 11 having two identical sides 12. The sides 12 have a central recess 13 to accommodate a porous metal filter disk 14. A small shallower recess 15 is concentrically formed at the bottom of recess 13 to receive a filter support and flow distribution screen 16. Recess 15 is substantially the same depth as the thickness of screen 16. A central bore 17 leads to the center of recess 15.

Figure 2:
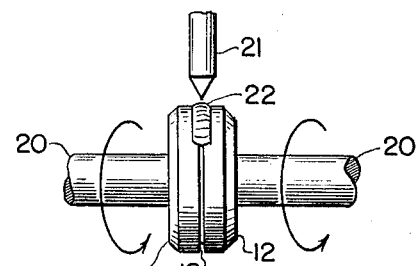
FIG. 2 is a side view of elements of the filter prior to its assembly.
Figure 2:
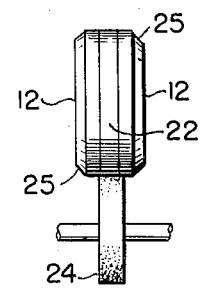
Figure 2:
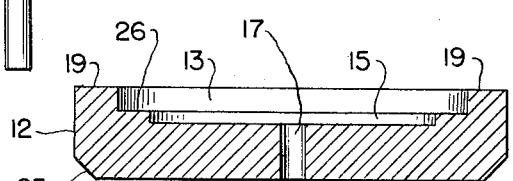
Figure 2:
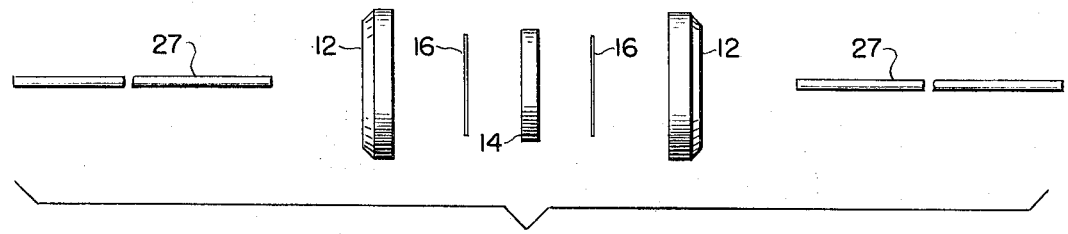

As shown by their positioning in FIG. 2, the sides 12 have the screens 16 placed in their recesses 15 and the large recesses 13 are placed about a filter disk 14. As shown in FIG. 3, the sides 12 fit about disk 14 with a slight clearance 18 between the abutting faces 19 of the sides 12. The sides 12 are clamped about disk 14 by jaws 20 and rotated while a welding tip 21 forms a circumferential weld 22 joining the sides 12 together about disk 14. As shown in FIG. 4, the weld 22 is ground smooth by an abrasive wheel 24 or it is otherwise smoothed between the beveled edges 25 of each side 12. Before or after this smoothing of weld 22, the weld 22 is allowed to cool and contract clamping disk 14 between the surfaces 26 as shown in FIG. 1.

After removing or unclamping the jaws 20, tube lengths 27 are soldered in the bores 17 to complete the process of assembling a filter 10. Since the tubes 27 are 1/8 or 1/16 inch outside diameter tubing with small inner passages 28, the tubes 27 should be soldered in bores 17 a slight distance 30 from recesses 15 so that the inner passages 28 will not have their flow restricted by a wire of a screen 16. If a screen 16' is used as shown in FIG. 6 having a central aperture 33, the tubes 27 can extend flush to the recesses 15 as the inner passage 28 will discharge or receive unblocked flow into or from aperture 33.

Filters made by the process of this invention enjoy many advantages. First, the circumferential weld 22 joins the filter body sides 12 and then contracts to seal the filter disk in place. Second, no conventional seal is required about the peripheral edge of disk 14 to prevent unfiltered flow past it. The method of fabricating a filter 10 without a seal reduces the total void volume within the filter 10 to a minimum. This is important to chromatography apparatus manufacturers as it enables them to take various effluents from a chromatography column and read out results with very sharp peaks on an oscilloscope. If a filter with a larger void volume is employed, the resulting mixing of one effluent with the following effluent causes a much broader peak in an oscilloscope reading.

A third advantage results from the fact that the screens 16 are the same thickness as the depth of the recesses 15 so that they support the filter disk 14 against high pressures from the upstream side which could otherwise break a filter disk 14. Finally, the filter 10 can be connected to a tube line by using conventional compression type fittings to connect the filter 10 in any tube line. If a filter 10 is to be changed from one line to another, the ends of the tube lengths 27 are cut off and the filter 10 can then be used again. When the tube lengths 27 are used up or the filter disk 14 is completely plugged, the filter 10 is thrown away.

One filter made according to this invention had a filter body 11 1 inch in diameter and 7/16 inches thick. The filter disk 14 was 0.800 inch in diameter and 0.100 inch thick. The screens 16 were 0.700 inch in diameter and 0.009 inch thick of 40 by 40 mesh. The tube lengths 27 were 0.062 inch O.D. with 0.015 inch wall thickness about 6 inches long. The grade of filter disk 14 was from 0.1 micron to 100 microns. The filter 10 was fabricated from 300 series stainless steel to receive up to 5,000 p.s.i.

What is claimed is:

1. The process of fabricating a filter comprising the steps of
   a. providing two disk shaped sides each containing a large recess, a smaller shallower recess, and a central bore,
   b. placing a porous filter disk in the large recess and clamping the sides about the filter disk with a clearance between the sides, c. circumferentially welding the sides forming a filter body,
d. allowing the weld to cool and contract clamping and sealing the filter disk within the filter body, and
e. unclamping the sides and fixing tubing lengths in the central bores of the filter body sides.

2. The process according to claim 1 with the additional step after step (a) of placing distribution screens in the smaller shallower recesses of substantially the same thickness as the depth of the smaller shallower recesses.

3. The process according to claim 2 wherein in step (e) the tubing lengths are fixed in the bores by soldering.

4. The process according to claim 3 wherein in step (e) the tubing lengths are soldered in the bores a distance from the screens.

5. The process according to claim 3 wherein in step (e) the screens contain a central aperture and the tube lengths are soldered in the bores to extend to the screens.

* * * * *